United States Patent [19]
Yoshida et al.

[11] Patent Number: 5,003,521
[45] Date of Patent: Mar. 26, 1991

[54] OPTICAL DISK DISCRIMINATING DEVICE

[75] Inventors: Tadao Yoshida, Kanagawa; Kazuhiko Fujiie; Ryo Ando, both of Tokyo, all of Japan

[73] Assignee: Sony Corporation, Tokyo, Japan

[21] Appl. No.: 243,036

[22] PCT Filed: Dec. 21, 1987

[86] PCT No.: PCT/JP87/01006
§ 371 Date: Aug. 18, 1988
§ 102(e) Date: Aug. 18, 1988

[87] PCT Pub. No.: WO88/05202
PCT Pub. Date: Jul. 4, 1988

[30] Foreign Application Priority Data
Dec. 27, 1986 [JP] Japan ........................................ 203808

[51] Int. Cl.$^5$ ................................................. G11B 7/00
[52] U.S. Cl. ................................. 369/44.25; 369/44.27; 369/54
[58] Field of Search ................. 369/54, 58, 116, 44.25, 369/44.41, 44.42, 44.27, 44.29, 44.25

[56] References Cited
U.S. PATENT DOCUMENTS

| 4,611,317 | 9/1986 | Takeuchi et al. ................. 369/50 X |
| 4,642,803 | 2/1987 | Drexler ................................. 369/54 |
| 4,685,098 | 8/1987 | Yoshida ................................ 369/54 |
| 4,688,203 | 8/1987 | Koishi et al. ..................... 369/58 X |
| 4,831,611 | 5/1989 | Sasaki et al. ...................... 369/116 |

FOREIGN PATENT DOCUMENTS

| 58-161160 | 9/1983 | Japan ........................................ 369/58 |
| 59-60742 | 4/1984 | Japan ........................................ 369/54 |
| 52-98333 | 6/1984 | Japan ........................................ 369/116 |
| 59-98333 | 6/1984 | Japan . |
| 61-60838 | 7/1986 | Japan . |
| 61-258367 | 11/1986 | Japan ........................................ 369/58 |
| 2133914 | 8/1984 | United Kingdom ............... 369/116 |

Primary Examiner—Donald McElheny, Jr.
Attorney, Agent, or Firm—Philip M. Shaw, Jr.

[57] ABSTRACT

An objective lens (3) of an optical pick up head (10) is moved in a direction of the optical axis, and a signal level of the output detected by the optical pick up head (10) before and after a focussed state is compared with predetermined reference levels ($Vref_1$) and ($Vref_2$) level comparators (32) and (33), In order to discriminate the reproduction-only disk from the recording disk by utilizing a difference in the reflection factor on the recording surface on the optical disk (20). Operation of the optical disk recording/reproducing apparatus is automatically switched over depending upon the kind of the optical disk.

8 Claims, 3 Drawing Sheets

OPTICAL DISK DISCRIMINATING DEVICE

TECHNICAL FIELD

This invention relates to an optical disk discriminating device for discriminating the kinds of the disk, such as the optical disk dedicated to reproduction or the recordable optical disk, and may be applied for example to an optical disk recording and/or reproducing apparatus provided with the function of opto-magnetic recording.

BACKGROUND ART

There has been extensively provided an optical disk device dedicated to reproduction, including a CD player or a video disk player employing an optical disk such as a digital audio disk or so-called compact disk or a video disk. There is also proposed an optical disk recording and/or reproducing apparatus in which data may be recorded and/or reproduced with the use of a rewritable opto-magnetic disk.

It is noted that, for optically reading the information recorded on the optical disk, an optical pickup head is extensively used in which the laser light is radiated on the recording surface of the optical disk to detect the light reflected from the recording surface. The disk dedicated to reproduction presents reflectivity on the recording surface different from that on the recording surface of the recordable disk, such that, in the case of the optical disk dedicated to reproduction, such as the compact disk, about 90% of the light is reflected by the aluminium reflecting surface applied to the recording surface, whereas, in the case of the rewritable opto-magnetic disk, about 10 to 20 percent of the light is reflected from the opto-magnetic recording layer, such as the TbFeCo layer.

For assuring compatibility with respect to the compact disk in the optical disk recording and/or reproducing apparatus employing a rewritable opto-magnetic disk, it is necessary to switch the gains of the tracking servo or focus servo employing the reproduction outputs obtained at the optical pickup head, or occasionally to switch the polarities of the error signals in dependence upon the kind of the optical disk which is in use, since the reflectivities on the recording surfaces of the disk dedicated to reproduction and the recordable disk are different from each other, as discussed hereinabove.

Thus the present invention is aimed to realize an optical disk recording and/or reproducing apparatus wherein the operation of the optical disk recording and/or reproducing apparatus is switched automatically in dependence upon the kind of the optical disk to enable both the disk dedicated to reproduction and the recordable disk to be reproduced, and provides an optical disk discriminating device which is adapted for discriminating the disk dedicated to reproduction and the recordable disk from each other.

DISCLOSURE OF THE INVENTION

An optical disk discriminating device comprising an optical pickup for detecting the light reflected from the recording surface of the disk, the optical pickup including means for irradiating the recording surface of an optical disk with a beam of light, photosensor means for converting incident light into a corresponding electrical output signal, an objective lens for focussing the light reflected by the optical disk's recording surface onto the photosensor, servo means for shifting the objective lens along its optical axis into and out of its focussed state, and discriminating circuit means having level comparator means and supplied with the photosensor's output signal for comparing its signal level obtained in the vicinity of the focussed state of the objective lens with a reference level and producing an error signal output which is supplied to the servo means, characterized in that the discriminating circuit means, includes means for discriminating the type of optical disk which is being read on the basis of the difference in magnitude of the photosensor's output signal caused by the difference in reflectivity of the recording surface of the optical disks.

BEST MODE OF EXECUTING THE INVENTION

Figure 1:
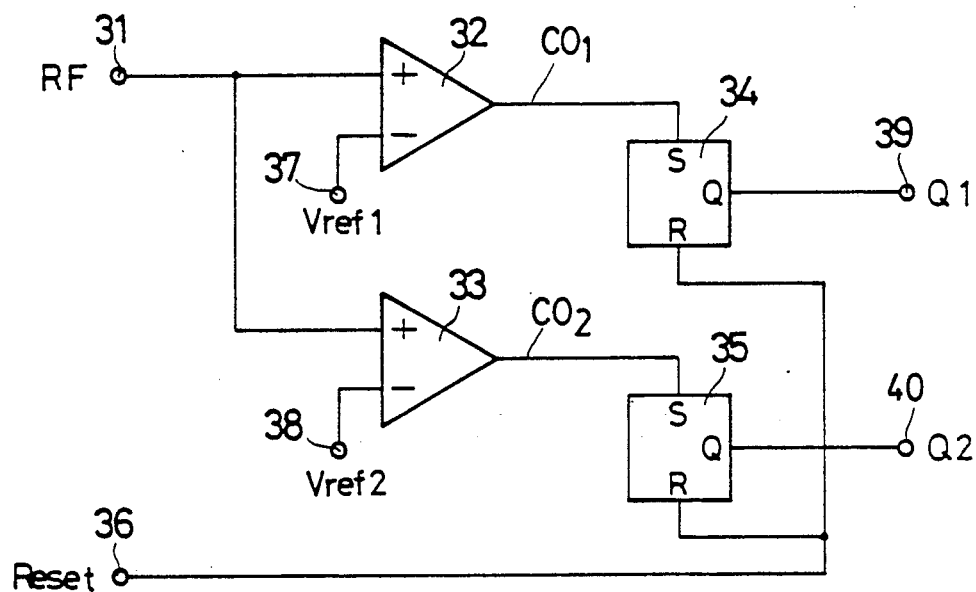
FIG. 1 is a block diagram showing the essential construction of an embodiment of an optical disk discriminating device according to the present invention.
Figure 2:
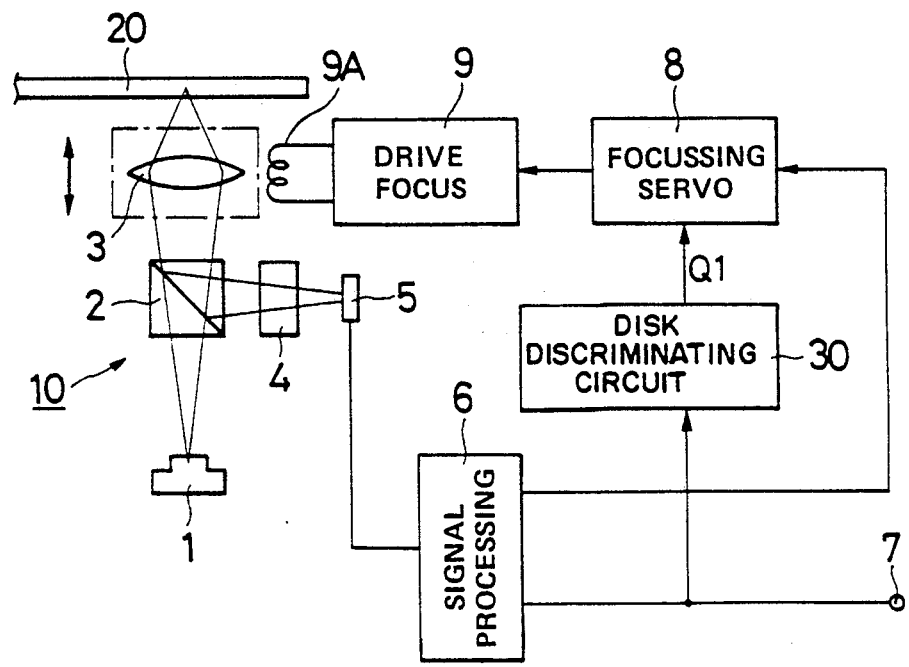
FIG. 2 is a block diagram showing the construction of the reproducing system of a CD player to which the present invention is applied.

An embodiment of the optical disk discriminating device according to the present invention will be explained in detail by referring to the drawings.

The embodiment shown in FIGS. 1 to 5 represents an application of the present invention to the reproducing system of the CD player having the function of opto-magnetic recording. As shown in the block diagram of FIG. 2, the reproducing system of the CD player in the present embodiment has an optical pickup head 10 adapted for optically reading the information recorded on the recording surface of the optical disk 20, wherein the laser beam emitted from a laser source 1 is radiated on an optical disk 20 by way of a beam splitter 2 and an objective lens 3, with the reflected light from the recording surface of the optical disk 20 being conducted by way of the objective lens 3, beam splitter 2 and an analyzer 4 to a photosensor 5 adapted for detecting the reflected light and with the output detected by the photosensor 5 being transmitted by way of a signal processing circuit 6 and a signal output terminal 7 as a reproduced RF signal. Driving currents in the form of, for example, triangular waves, are caused to flow in a focus coil 9A by a focus driving circuit 9 to shift the objective lens 3 of the optical pickup head 10 along its optical axis to bring the system to a focused state. After the objective lens 3 is brought to its focused state, focus error signals derived at the signal processing circuit 6 from the detected output of the photosensor 5 are switched so as to be fed back through a focus servo circuit 8 to the focus drive circuit 9 for performing focus control.

In the present embodiment, reproduced RF signals obtained at the signal processing circuit 6 are transmitted to a disk discriminating circuit 30 such that the gain of the focus servo circuit 8 is switched by the discriminating output from the circuit 30 in dependence upon the kinds of the optical disk 20.

As shown in the block diagram of FIG. 1, the disk discriminating circuit 30 is formed by level comparators 32 and 33, to which the aforementioned reproduced RF signals are transmitted by way of a signal input terminal 31 and SR flipflops 34 and 35. The set inputs of the flipflops 34 and 35 are supplied with the comparison outputs of the level comparators 32 and 33, respectively. Reset pulses are transmitted to the reset inputs of the SR flipflops 34 and 35 at the time of the disk discrimination from a system controller, not shown, by way of a reset input terminal 36. The outputs of the flip flops 34 and 35 are supplied to output terminals 39 and 40, respectively.

Figure 3:
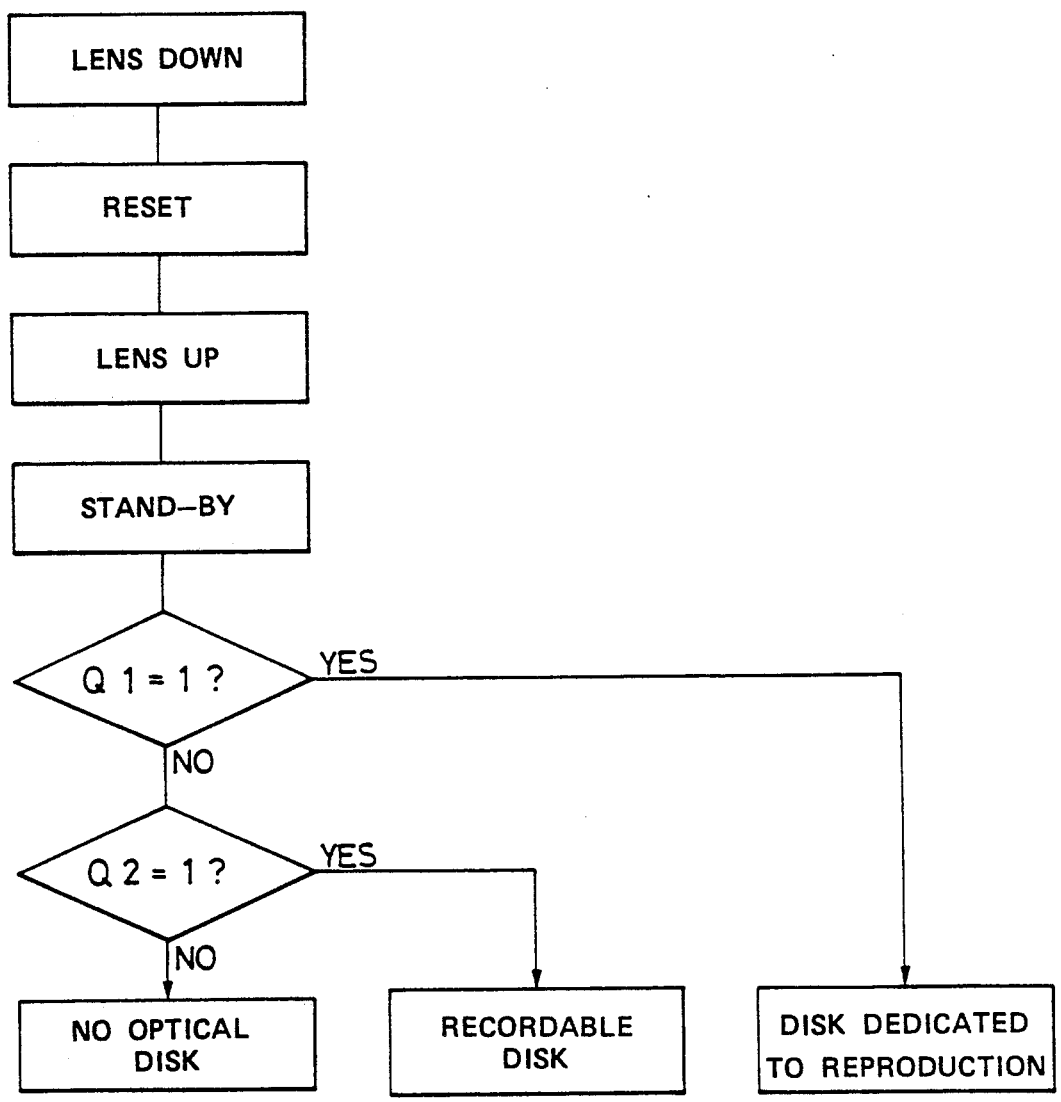
FIG. 3 is a flow chart showing the steps of the discriminating operation in the above embodiment.

When performing the disk discrimination in the reproducing system of the present embodiment, as shown in the flow chart of FIG. 3, the focus drive circuit 9 is driven by a system controller, not shown, in such a sequence that the objective lens 3 is brought to its lowermost position, the flipflops 34 and 35 of the discriminating circuit 30 are reset under this condition and the objective lens 3 is then raised to a position beyond the focused position so as to be then at a stand-by state. With the objective lens 3 shifted in this manner, the signal level is changed in dependence upon the position of the objective lens 3, such that a reproduced RF signal having a peak at the focused position is derived at the signal processing circuit 6 from the detection output of the optical pickup head 10.

It is noted that, when the optical disk 20 is a disk dedicated to reproduction, about 90 percent of the light is reflected by an aluminium reflecting film coated on the disk recording surface and, when it is a rewritable disk, about 10 to 20 percent of the light is reflected by an opto-magnetic recording film, such as TbFeCo film, so that the peak level of the aforementioned reproduced RF signal produced from the detection output of the optical pickup head 10 adapted for detecting the reflected light becomes higher in the case of the disk dedicated to reproduction than in the case of the recordable disk. In the present embodiment, a first reference level $Vref_1$ intermediate the peak level of the reproduced RF signal for the reproduction dedicated disk (SCD) and the peak level of the reproduced RF signal for the recordable disk (SMO) is supplied to a reference input terminal 37 of the level comparator 32, whilst a second reference level $Vref_2$ lower than the peak level of the reproduced RF signals for the recordable disk is supplied to the reference input terminal 37 of the level comparator 32.

Figure 4:
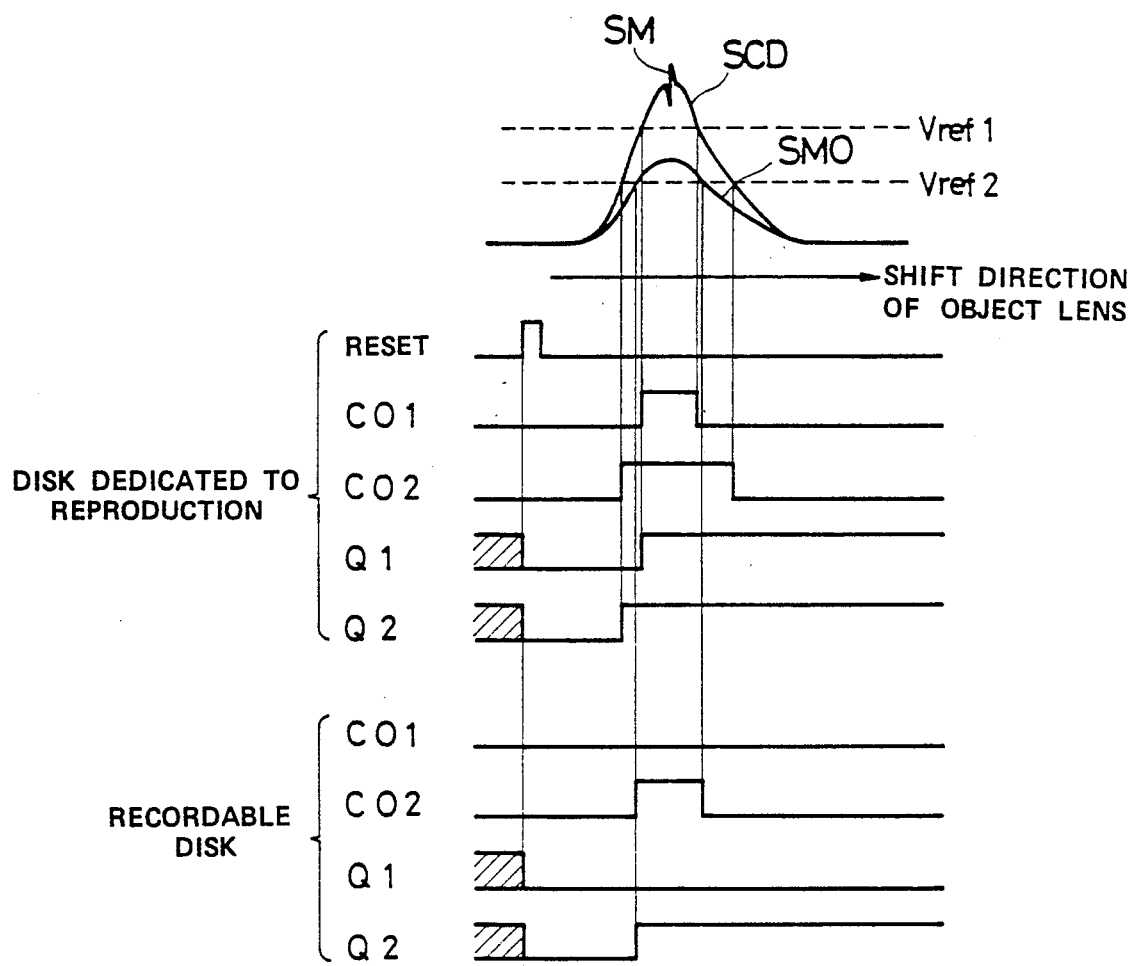
FIG. 4 is a waveform diagram showing the operation of the discriminating circuit in the above embodiment.

As shown in FIG. 4, when the optical disk 20 is a disk dedicated to reproduction, comparison outputs $CO_1$ and $CO_2$ of the level comparators 32 and 33 of the discriminating circuit 30 are both at a logical "1", such that the flipflops 34 and 35 are set by these comparison outputs and discrimination outputs $Q_1$ and $Q_2$ at the logical "1" are produced at the discrimination output terminals 39 and 40. When the optical disk 20 is a recordable disk, only the comparison output $CO_2$ of one of the level comparators 33 of the discriminating circuit 30 is at logical "1" such that the flipflop 35 is set by this comparison output and the discrimination output $Q_2$ at the logical "1" is produced only at the discriminating output terminal 40. Thus the discriminating circuit 30 indicates that the optical disk is not mounted in position when the discriminating outputs $Q_1$ and $Q_2$ produced at the discriminating output terminals 39 and 40 are at logical "0", that the optical disk 20 mounted in position is a recordable disk when only the discriminating output $Q_2$ produced at the one discriminating output terminal 40 is at a logical "1" and that the optical disk 20 mounted in position is a disk dedicated to reproduction when the discriminating output $Q_2$ produced at the other discriminating output terminal 39 is at a logical "1".

Figure 5:
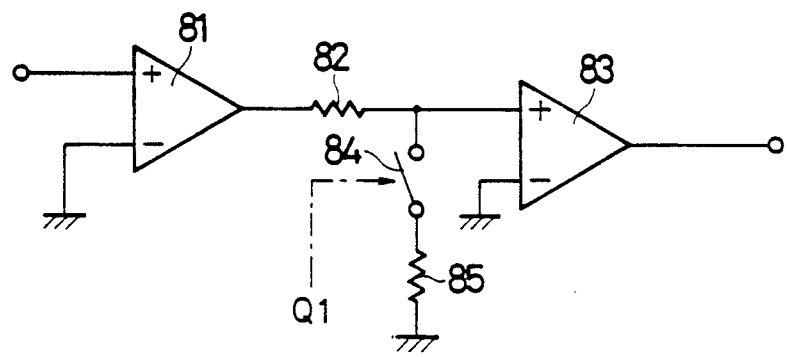
FIG. 5 is a circuit diagram showing the construction of a focus servo circuit in the above embodiment.

As best shown in FIG. 5, the focus servo circuit 8 in the present embodiment has an output terminal of a first servo amplifier 81 connected to an non-inverting input terminal of a second servo amplifier 83 via first resistor 82 and has the same input terminal of the second servo amplifier 83 grounded via series circuit consisting of a switch 84 and a second resistor 85. The focus servo circuit is so designed that, when the discriminating output $Q_1$ of the aforementioned discriminating circuit 30 is at logical "1", that is, when the optical disk 20 attached in position is a disk dedicated to reproduction, the switch 84 is closed to lower the servo gain to effect servo control suitable for the disk dedicated to reproduction.

In accordance with the optical disk discriminating device of the present embodiment, the difference in the reflectivity on the record surface of the optical disk is sensed to produce discriminatoin outputs for the disk dedicated to reproduction and the recordable disk, such that, by the application of the discriminating device, there may be realized an optical disk recording and reproducing apparatus wherein the operation of the optical disk recording and reproducing apparatus is autmatically switched in dependence upon the kinds of the optical disk to permit the reproduction of both the disk dedicated to reproduction and the recordable disk.

What is claimed is:

1. An optical disk discriminating device comprising an optical pickup for detecting the light reflected from the recording surface of the disk, the optical pickup including means for irradiating the recording surface of an optical disk with a beam of light, photosensor means for converting incident light into a corresponding electrical output signal, an objective lens for focussing the light reflected by the optical disk's recording surface onto the photosensor, servo means for shifting the objective lens along its optical axis into and out of its focussed state, and discriminating circuit means having level comparator means and supplied with the photosensor's output signal for comparing its maximum signal level, which is obtained in the vicinity of the focussed state of the objective lens, with a first predetermined reference level and producing an error signal output which is supplied to the servo means, characterized in that the discriminating circuit means, on the basis of the difference in magnitude of the photosensor's output signal caused by the difference in reflectivity of the recording surface of the optical disks, is capable of discriminating the type of optical disk which is being read.

2. The device according to claim 1 characterized in that the level comparator means compares the signal level of the photosensor's output with a second predetermined reference level for discrimination of a disk dedicated to reproduction and with a third predetermined reference level for discrimination of a recordable disk.

3. The device according to claim 2 characterized in that the discriminating circuit means comprises a first memory means for temporarily storing the first comparison output by the comparator means and a second memory means for temporarily storing a second comparison output by the comparator means.

4. The device according to claim 3 characterized in that means are provided for clearing the contents of the first and second memory means.

5. An optical disk discriminating device comprising an optical pickup for detecting the light reflected from the recording surface of the disk, the optical pickup including means for irradiating the recording surface of an optical disk with a beam of light, photosensor means for converting incident light into a corresponding electrical output signal, an objective lens for focussing the light reflected by the optical disk's recording surface onto the photosensor, servo means for shifting the objective lens along its optical axis into and out of its focussed state, and discriminating circuit means having level comparator means and supplied with the photosensor's output signal for comparing its maximum signal level, which is obtained in the vicinity of the focussed state of the objective lens, with a predetermined first reference level and producing an error signal output which is supplied to the servo means, characterized in that the discriminating circuit means includes means for discriminating the type of optical disk which is being read on the basis of the difference in magnitude of the photosensor's output signal caused by the difference in reflectivity of the recording surface of the optical disks.

6. The device according to claim 5 characterized in that the servo means has an adjustable gain and the level comparator means compares the signal level of the photosensor's output with a second predetermined reference level representing a disk dedicated to reproduction and with a third predetermined reference level representing a recordable disk, and adjusts the gain of the servo means in accordance with the result of these comparisons.

7. The device according to claim 6 characterized in that the discriminating circuit means comprises a first memory means for temporarily storing the first comparison output by the comparator means and a second memory means for temporarily storing a second comparison output by the comparator means.

8. The device according to claim 7 characterized in that means are provided for selectively clearing the contents of the first and second memory means.

* * * * *